US008021525B2

(12) United States Patent  (10) Patent No.: US 8,021,525 B2
Giddey et al.  (45) Date of Patent: Sep. 20, 2011

(54) PEM WATER ELECTROLYSIS FOR OXYGEN GENERATION METHOD AND APPARATUS

(75) Inventors: Sarbjit Singh Giddey, Glen Waverley (AU); Fabio T. Ciacchi, Clayton (AU); Sukhvinder P. S. Badwal, Clayton (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 1071 days.

(21) Appl. No.: 11/803,870

(22) Filed: May 16, 2007

(65) Prior Publication Data

US 2008/0283412 A1   Nov. 20, 2008

(51) Int. Cl.
  *C25B 9/10*   (2006.01)
  *C25B 1/02*   (2006.01)
  *H01M 8/06*   (2006.01)

(52) U.S. Cl. ........ 204/257; 204/252; 204/253; 204/254; 204/255; 204/256; 204/258; 205/628; 205/633; 205/637; 429/418; 429/443; 429/444; 429/447; 429/452; 429/457; 429/480; 429/481; 429/492; 429/494

(58) Field of Classification Search ................. 205/628, 205/633, 637; 204/252, 253, 254, 255, 256, 204/257, 258, 271; 429/416, 417, 418, 443, 429/444, 447, 449, 452, 457, 471, 480, 481, 429/492, 494, 529

See application file for complete search history.

(56) References Cited

U.S. PATENT DOCUMENTS 5,837,110 A  11/1998  Dean
6,423,203 B1  7/2002  Faita et al.
(Continued)

FOREIGN PATENT DOCUMENTS

WO  WO-2006/092612 A2  9/2006

OTHER PUBLICATIONS

International Search Report for Application No. PCT/AU2008/000657, dated Jun. 26, 2008.

(Continued)

*Primary Examiner* — Bruce Bell
(74) *Attorney, Agent, or Firm* — Nelson Mullins Riley & Scarborough LLP; Anthony A. Laurentano

(57) ABSTRACT

A PEM based water electrolysis stack consists of a number of cells connected in series by using interconnects. Water and electrical power (power supply) are the external inputs to the stack. Water supplied to the oxygen electrodes through flow fields in interconnects is dissociated into oxygen and protons. The protons are transported through the polymer membrane to the hydrogen electrodes, where they combine with electrons to form hydrogen gas. If the electrolysis stack is required to be used exclusively as an oxygen generator, the hydrogen gas generated would have to be disposed off safely. The disposal of hydrogen would lead to a number of system and safety related issues, resulting in the limited application of the device as an oxygen generator. Hydrogen can be combusted to produce heat or better disposed off in a separate fuel cell unit which will supply electricity generated, to the electrolysis stack to reduce power input requirements. This however, will add to system complexity, cost and efficiency loss. The present invention provides an improved method and a simple system for the production of oxygen.

17 Claims, 7 Drawing Sheets

U.S. PATENT DOCUMENTS

| | | |
|---|---|---|
| 6,495,025 B2 | 12/2002 | Velev |
| 6,610,193 B2 | 8/2003 | Schmitman |
| 7,045,238 B2 | 5/2006 | Gottmann et al. |
| 7,097,925 B2 | 8/2006 | Keefer |
| 2002/0172844 A1 | 11/2002 | Ito et al. |
| 2004/0101723 A1* | 5/2004 | Kruppa et al. ............. 429/22 |
| 2004/0146759 A1 | 7/2004 | Hecker et al. |
| 2007/0092769 A1 | 4/2007 | Davis et al. |

OTHER PUBLICATIONS

Katoh, M. et al., "Polymer electrolyte-type electrochemical ozone generator with an oxygen cathode," Journal of Applied Electrochemistry, vol. 24:489-494 (1994).

Supplementary European Search Report for Application No. 08747928.3, dated Dec. 6, 2010.

\* cited by examiner

PEM WATER ELECTROLYSIS FOR OXYGEN GENERATION METHOD AND APPARATUS

FIELD OF THE INVENTION

The present invention relates to oxygen production systems utilising fuel cell and water electrolysis principles.

BACKGROUND

Any discussion of the prior art throughout the specification should in no way be considered as an admission that such prior art is widely known or forms part of common general knowledge in the field.

In certain environments, the production of high levels of oxygen on demand is highly desirable. For example, in hospitals and other locations where sick and elderly patients reside, for homecare oxygen therapy, in addition to aeroplane environments, systems that are able to supply highly concentrated oxygen on demand are important.

One common method of oxygen supply is in a specialised high pressure tank form. The tank form can be unduly cumbersome, requiring resupply and the storage of pure oxygen can be dangerous in some environments.

Systems have been developed to separate oxygen from the ambient air. For example, U.S. Pat. No. 4,449,990 discloses one such system. Again, this system can be cumbersome to operate.

U.S. Pat. No. 6,495,025 to Velev, provides an extremely brief disclosure of an oxygen production system for producing oxygen from water by subjecting the water to electrolysis to produce $H_2$ and $O_2$. The system of Velev has a number of operational disadvantages including: the need to operate a separate fuel cell and electrolysis cell apparatus which is unduly cumbersome, requiring the returning of the $H_2$ to a water storage zone and there are safety issues associated with the overall process.

SUMMARY OF THE INVENTION

It is an object of the present invention to provide an improved method and system for the production of oxygen.

In accordance with a first aspect of the present invention, there is provided an oxygen production system comprising: an electrolysis cell including a proton exchange membrane (PEM) between a cathode electrode and an anode electrode and interconnected to an electrical power source; an air supply directed to the cathode electrode of the electrolysis cell so as to suppress hydrogen gas production in favour of water or steam production at the cathode electrode.

Preferably, the air supply can be utilised on the cathode side of the cell in conjunction with hydrogen production to produce water or steam. The water or steam can be subsequently utilised on the anode side of the electrolysis cell for further oxygen production.

Preferably, the cathode electrode includes a hydrophobic material and the air supply supplies air to the cathode at greater than atmospheric pressure. The air can be distributed substantially evenly over the surface of the cathode electrode.

In alternative arrangements, the air supply can be variable, thereby varying the degree of hydrogen gas suppression at the cathode electrode. In other stack type arrangements, at least two of the oxygen production cells can be provided spaced around a bipolar interconnect plate.

In accordance with a further aspect of the present invention, there is provided a method of oxygen production utilising an electrolysis cell, the method including the step of: (a) supplying a concentrated airflow to the cathode electrode of the electrolysis cell so as to suppress hydrogen production at the cathode electrode in preference for water or steam production and (b) regulating operating variables such as air back pressure and volumetric air flow for uniform oxygen distribution over the entire cathode/electrolyte contact area.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION OF THE PREFERRED AND OTHER EMBODIMENTS

In the preferred embodiment there is provided an arrangement using fuel cell and electrolysis principles for the production of oxygen. Through the utilisation of an adapted Polymer Electrolyte Membrane (PEM) Electrolysis Stack arrangement, a simplified oxygen production system is provided that is able to produce oxygen on demand to high pressures.

Figure 1:
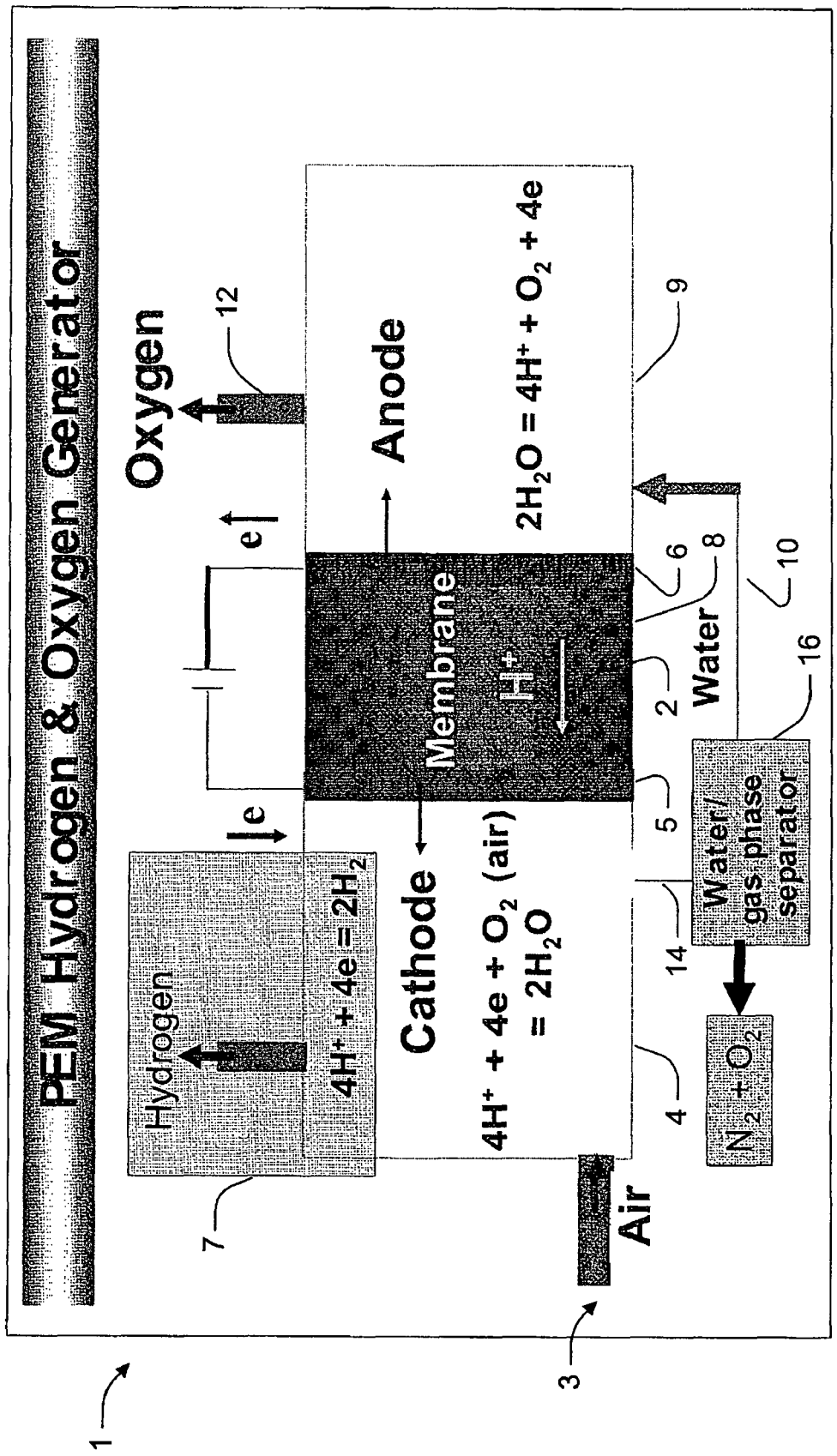
FIG. 1 illustrates schematically the operation of an oxygen generation apparatus of the preferred embodiment.

Turning initially to FIG. 1, there is illustrated schematically the arrangement of a PEM Electrolysis stack 1 constructed for the production of Oxygen in accordance with the teachings of the preferred embodiment.

The arrangement 1 can be constructed along the lines of a normal PEM electrolysis stack where a number of membrane electrode assemblies (MEAs) (only one of which is shown) are normally assembled together in series (or stack form) by using bipolar interconnect plates to produce required hydrogen/oxygen flow rates. Each MEA consists of a proton exchange membrane (PEM) 8, in the form of a polymer electrolyte membrane, sandwiched between a hydrogen electrode 5 forming part of the cathode 4 and an oxygen electrode 6 forming part of an anode 9. Water supplied to the anode is dissociated into protons, oxygen and electrons. The electrons travel through the outer circuit and the protons are transported through the membrane to the cathode. Under a normal electrolysis reaction they are combined with the electrons to produce hydrogen as per the following reactions:

at anode (oxygen electrode), $H_2O = 2H^+ + \frac{1}{2}O_2 + 2e$ 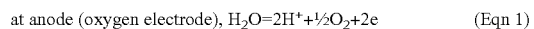 (Eqn 1)

at cathode (hydrogen electrode), $2H^+ + 2e = H_2$  (Eqn 2)

If the electrolysis stack is required to be used exclusively as an oxygen generator, the hydrogen gas generated at the cathode 4 of a normal electrolysis cell would have to be disposed off safely 7. The disposal 7 of hydrogen would lead to a number of system and safety related issues, resulting in the limited application of the device as an oxygen generator. In the conventional electrolysis reaction protons migrating through the membrane from anode to cathode are reduced to hydrogen as per the electrochemical reaction (Eqn 2) above.

In the stack 1 of the preferred embodiment, hydrogen production is suppressed and the migrating protons 2 are made to react with oxygen (supplied as air 3) supplied to the cathode 4, at the electrode/electrolyte interface 5 (i.e. triple phase boundaries—where electrolyte, electrode and gas are in contact). Thereby, molecular hydrogen evolution is substantially completely suppressed and water is generated on the cathode side as per the following electrochemical reaction.

$$2H^+ + \tfrac{1}{2}O_2 + 2e = H_2O \quad\text{(Eqn 3)}$$

The electrochemical reaction (Eqn 3) is an overall fuel cell reaction and is more favorable as compared to hydrogen evolution reaction (Eqn 2). Any lack of availability of oxygen and lack of timely removal of water produced can lead to a large concentration polarisation of the cathode 4, and hydrogen evolution reaction (Eqn 2) becoming more favourable 7. This condition is considered less desirable.

During operation, similar to a normal water electrolysis cell/stack, water 10 is supplied to the oxygen electrodes 9 via the normal interconnect flow fields, where it gets dissociated to protons 2 and oxygen 12. However, as noted above, the hydrogen electrodes 4 are supplied with air 3 via the interconnect flow fields, to carry out the electrochemical reaction between the protons and oxygen (acting as a oxygen electrode of a fuel cell) in the air to produce water 14 (rather than hydrogen in case of PEM electrolysis). One half 9 of each cell of the stack thereby operates in an electrolysis mode and the other half 4 in the fuel cell mode. On the cathode side 4, the hydrogen flow field design of the interconnect is preferably such that the input air 3 is uniformly distributed over the surface of the hydrogen electrode 5 of each cell for complete hydrogen consumption. This is in contrast to the hydrogen flow field of a normal PEM electrolyser, where its function is current collection and hydrogen collection only. The material of the interconnect and operating parameters are such that high current densities can be achieved without any trace of hydrogen generation on the fuel cell reaction side.

In practice, the device 1 allows the generation of oxygen 12 without significant traces of hydrogen up to high current densities meaning a very compact design with lower materials cost. The water produced 14 on the cathode side can be separated by a gas/liquid phase separator 16 and recirculated 10 to the anode for further oxygen generation. Thus there can be minimal requirement for water top up. It is conjectured that one liter of water can produce over 600 liters of oxygen at STP. The cell structure, the interconnect flow field design and operational parameter control allow the operation at high current densities without any traces of hydrogen produced.

A graphite based material for forming the gas interconnect is normally very suitable for the fuel cell reaction in Eqn 3, but may not be a favourable material for oxygen evolution reaction on the anode side 9. Therefore, in a stacked arrangement, the bipolar interconnect plate can be a composite of two materials for example graphite on cathode side and a metal/alloy (that can tolerate oxidising environment) on the anode side. Alternatively the interconnect or bipolar plate may be made from a corrosion resistant metal or alloy or has a protective coating of a corrosion resistant material.

As the hydrogen evolution reaction on the cathode side is substantially completely stopped in preference to the fuel cell reaction for water generation and the spent air (oxygen depleted air) on the cathode side contains almost no hydrogen. As a further benefit, the oxygen generated on the anode side also contains no hydrogen as compared to the potential of trace level of hydrogen in the case of conventional electrolysis operations.

The arrangement of the preferred embodiment, apart from its simple compact form, has the advantage that cell construction and stacking designs can be scaled up to larger active area cells and multi cell electrolysis stacks. Since half of the same cell is operating in the fuel cell mode, providing energy for the water electrolysis reaction, the method of operation results in significant reduction in power consumption as compared to the conventional electrolysis, where both oxygen as well as hydrogen gases are generated and in addition also reduces overall device size and complexity as would be the case if hydrogen had to be consumed in a separate fuel cell system or had to be disposed off in an alternative manner.

Figure 5:
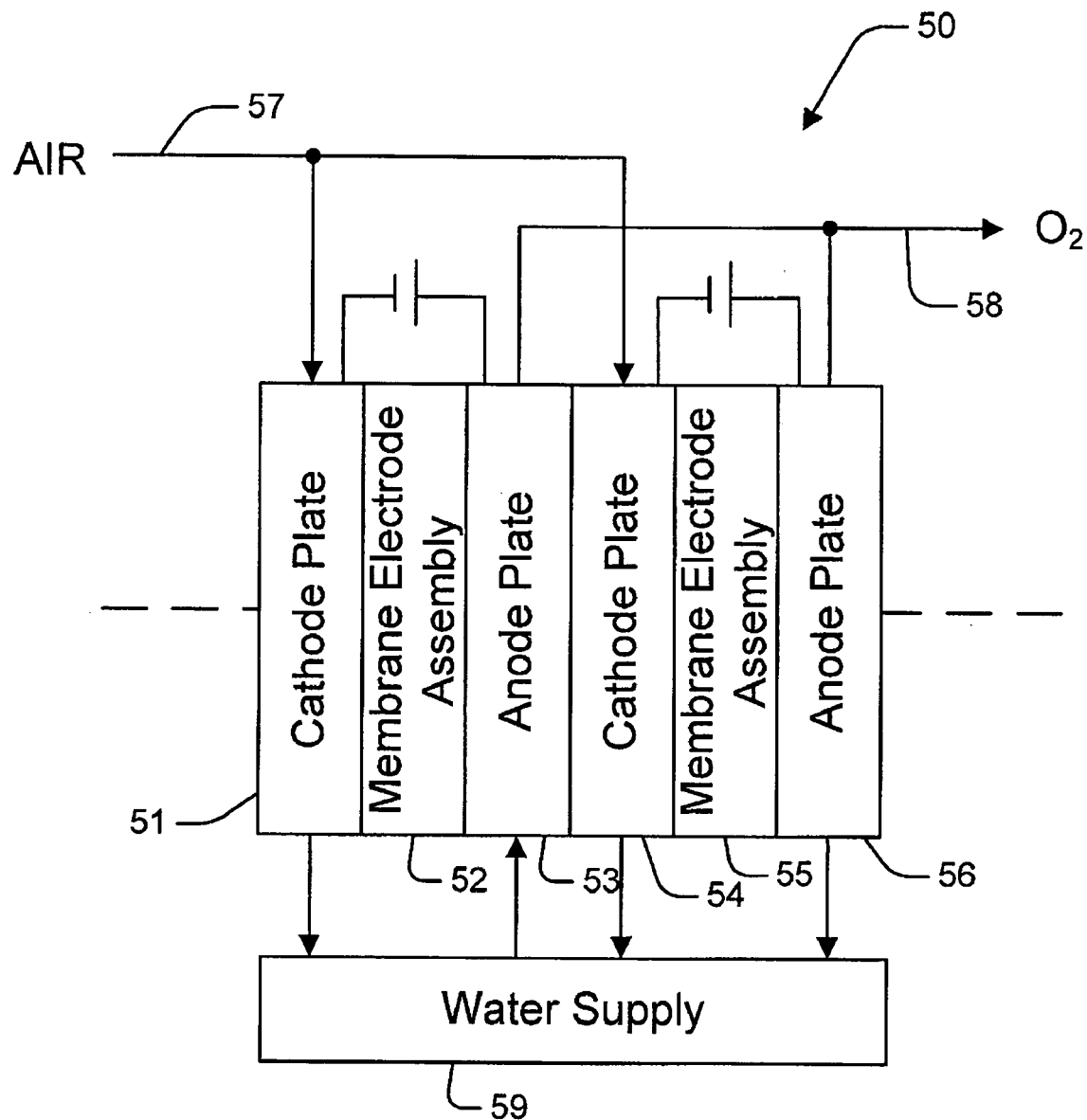
FIG. 5 illustrates schematically a multi-cell stack arrangement.

An example of a stack design 50 is illustrated schematically in FIG. 5, wherein two cells of a stack are shown. Each cell consists of a cathode interconnect plate e.g. 51, membrane electrode assembly 52 and anode interconnect plate 53. As is known in the art, adjacent plates e.g. 53, 54 can be combined into one bipolar plate. The stack can include additional cells in accordance with output requirements.

Returning to FIG. 1, where it is desired to output oxygen at high pressures, water to the stack has to be supplied 10 at similar pressures. Unfortunately, the polymer membrane 2 is unlikely to be able to sustain a pressure differential of more than about 400-500 mbar. Oxygen 12 can be generated at high pressure by either supporting the membrane 2 on the cathode side 4 or balancing the pressure on both sides to operate the stack below pressure differential limits. In one arrangement, the cathode side can be supported by a foraminous conductive element support that may act as a catalyst support during the fabrication of cathode or as a support to the prefabricated cathode structure. As an alternative, the air supply pressure to the cathode side 4 of the stack can be maintained in such a way that the pressure differentials across membrane 2 does not exceed the upper limits.

The cathode 4 includes a hydrophobic material that allows for easy removal of water produced on cathode side. This is in contrast to the hydrogen evolution reaction, which would be little effected by the hydrophobic properties of the cathode. The air supply 3 to the cathode 4 has to be sufficient to not only supply oxygen for the complete consumption of the protons, but also to quickly remove water being produced to provide excess to the air for further (continuation) reaction.

The catalyst and the cathode/electrolyte interface design is such that fuel cell reaction is favoured in preference to hydrogen evolution reaction.

The device can be fitted with a hydrogen sensor at the outlet 14 of fuel cell reaction (cathode) side. This sensor is interlocked with air supply 3 to the cathode, and the air flow regulated to ensure no hydrogen is produced. In case the device or the operation has reached its limit on current density, and there are traces of hydrogen in the outlet above the permissible limit, the sensor preferably is programmed to shut down the operation.

This device can be exclusively used as an oxygen generator with no generation of hydrogen gas and with lower power consumption as compared to PEM electrolyser for both hydrogen and oxygen generation. Furthermore, the water produced on the hydrogen side 4 can be recycled for further oxygen generation, resulting in principle no net water consumption. In this closed loop operation, the system is essentially operating as a net oxygen separator from the supplied air. This device can also be used as an oxygen concentrator or removal device, or as a PEM electrolyser for both oxygen and hydrogen generation.

In review therefore, similar to the water electrolysis stack, water is supplied to the oxygen electrodes 6 of the stack via the usual interconnect flow fields, where it gets dissociated to protons and oxygen. The hydrogen electrodes 5 are supplied with air 3 via the interconnect flow fields, to carry out the electrochemical reaction between the protons and oxygen (acting as a oxygen electrode of a fuel cell) in the air to produce water (rather than hydrogen in case of PEM electrolysis). The interconnect flow field design of cathode 5 is such that air is uniformly distributed over the surface of the hydrogen electrode 5 of each cell for complete hydrogen consumption. This is in contrast to the hydrogen flow field of a normal PEM electrolyser, where its function is current collection and hydrogen collection only. The material of the interconnect and operating parameters are such that high current densities can be achieved without any trace of hydrogen generation on the fuel cell reaction side.

Figure 6:
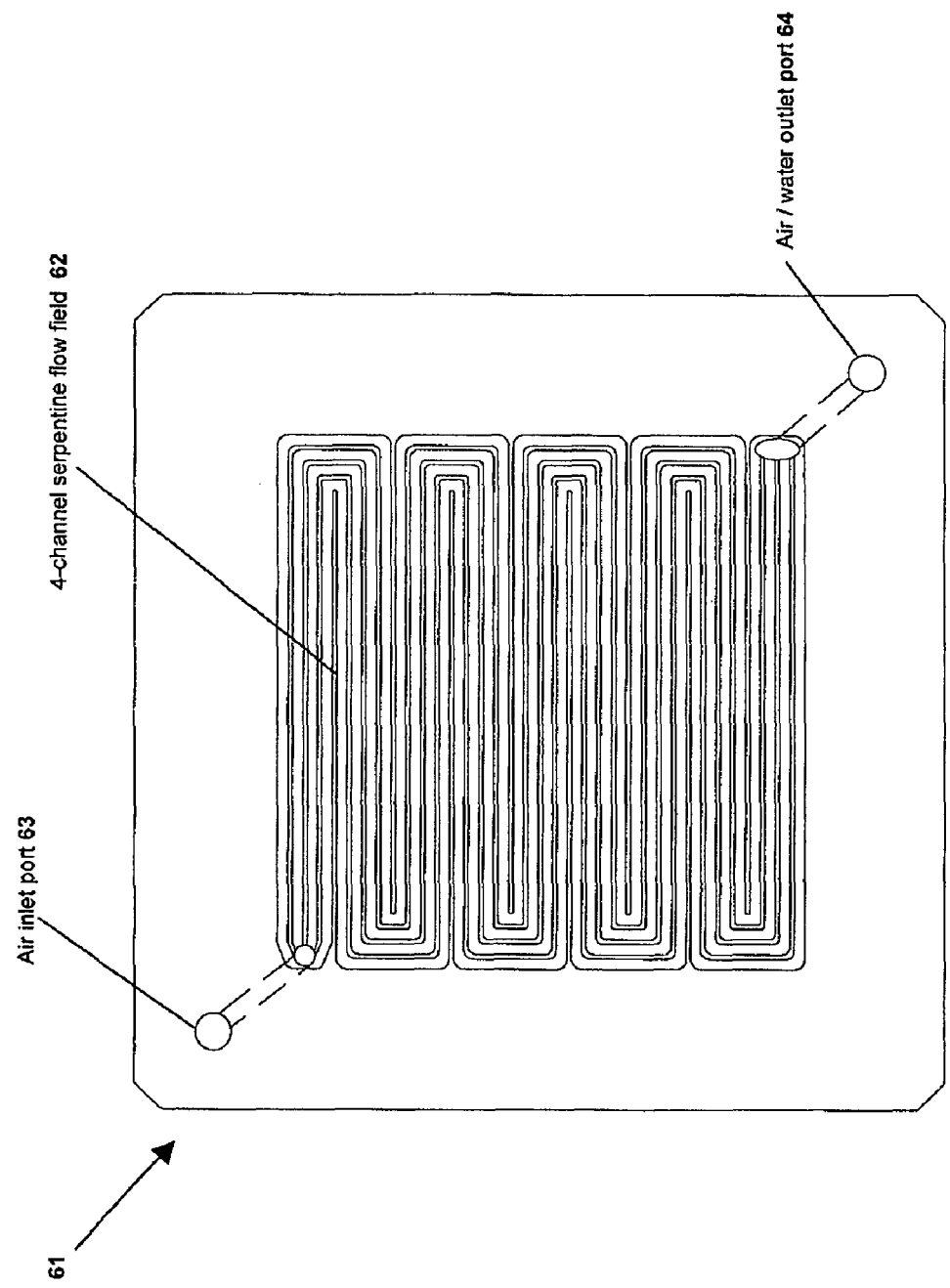
FIG. 6 illustrates a four channel serpentine flow field interconnect for air distribution on the cathode side of the cell.
Figure 7:
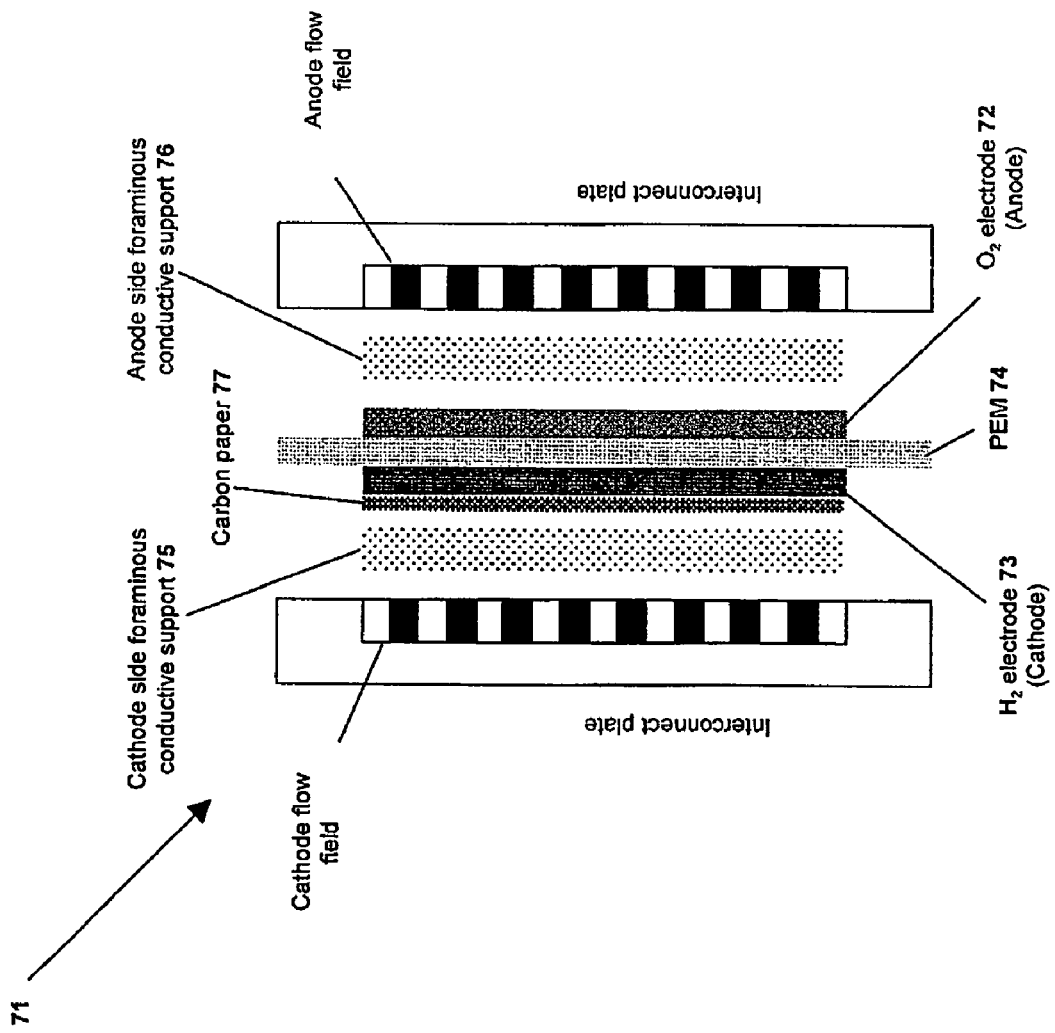
FIG. 7 illustrates a PEM membrane having a foraminous conductive element both on anode and cathode sides.

FIG. 6 illustrates a four channel serpentine flow field interconnect 61 for air distribution on the cathode side of the cell. The four channels 62 are connected to an air inlet port 63 and an air/water outlet port 64. Several variations of this flow field design are possible.

Where high pressures are utilized, one form of dealing with pressure differentials is to provide a supporting element on hydrogen electrode side or oxygen electrode side or both sides. FIG. 7 shows a schematic view of one form of the various components of the membrane electrode assembly (MEA) having supporting elements on both sides of MEA. The MEA, in the form of an electrolysis cell 71, includes a first electrode in the form of an oxygen electrode 72, and a second electrode in the form of a hydrogen electrode 73. A proton exchange membrane (PEM), in the form of a polymer electrolyte membrane 74, is interposed between the oxygen and hydrogen electrodes 72 and 73 such that protons can pass between the oxygen and hydrogen electrodes across the PEM. The supporting element is a foraminous metallic sheet or a mesh 75 and 76 positioned adjacent to the electrodes 72 and 73 or in the form of a substrate for the respective catalysts, bonded to the PEM 74, and provides mechanical or structural support for the PEM 74.

The hydrogen electrode 73 can consist of diffusion, catalyst and ionomer layers supported on a carbon paper support 77 with a porous structure. The diffusion layer may be made up of high surface carbon powder and a material such as PTFE to make the layer hydrophobic for easy water removal. The catalyst layer may be made up of ionomer and a noble metal catalyst supported on a high surface area carbon powder. The ionomer layer may be made up of the electrolyte material for good bonding to the electrolyte membrane and to maximise the triple phase boundaries at the interface. In an alternative configuration, the catalyst layer may be deposited directly on the foraminous element 75 which in turn is bonded directly to PEM 74.

The oxygen electrode 72 consists of catalyst and ionomer layers supported on a foraminous metallic element 76.

Constructed Embodiments

A number of devices were constructed in accordance with the teachings of the preferred embodiments. These included single cells (having 9 cm$^2$ to 150 cm$^2$ active areas) and a 2-cell stack (100 cm$^2$ active area). The arrangements were found to have up to 0.6 A.cm$^{-2}$ current densities with no hydrogen gas being generated on the cathode side of the cell.

The initial concept was tested on 9 cm$^2$ active area cells, but detailed study was conducted on 50 cm$^2$ active area cells. The 50 cm$^2$ active area cells were tested as electrolysis cells for hydrogen and oxygen generation, and for oxygen generation only. In oxygen (only) generation mode the hydrogen side functions in a fuel cell mode (i.e. this electrode acts similar to the oxygen electrode of a fuel cell, where protons combine with oxygen from air and produce water). Since graphite is a popular choice in the art for fuel cell interconnects, the hydrogen interconnect of the cell was a graphite interconnect with a 2-channel parallel serpentine flow field.

Figure 2:
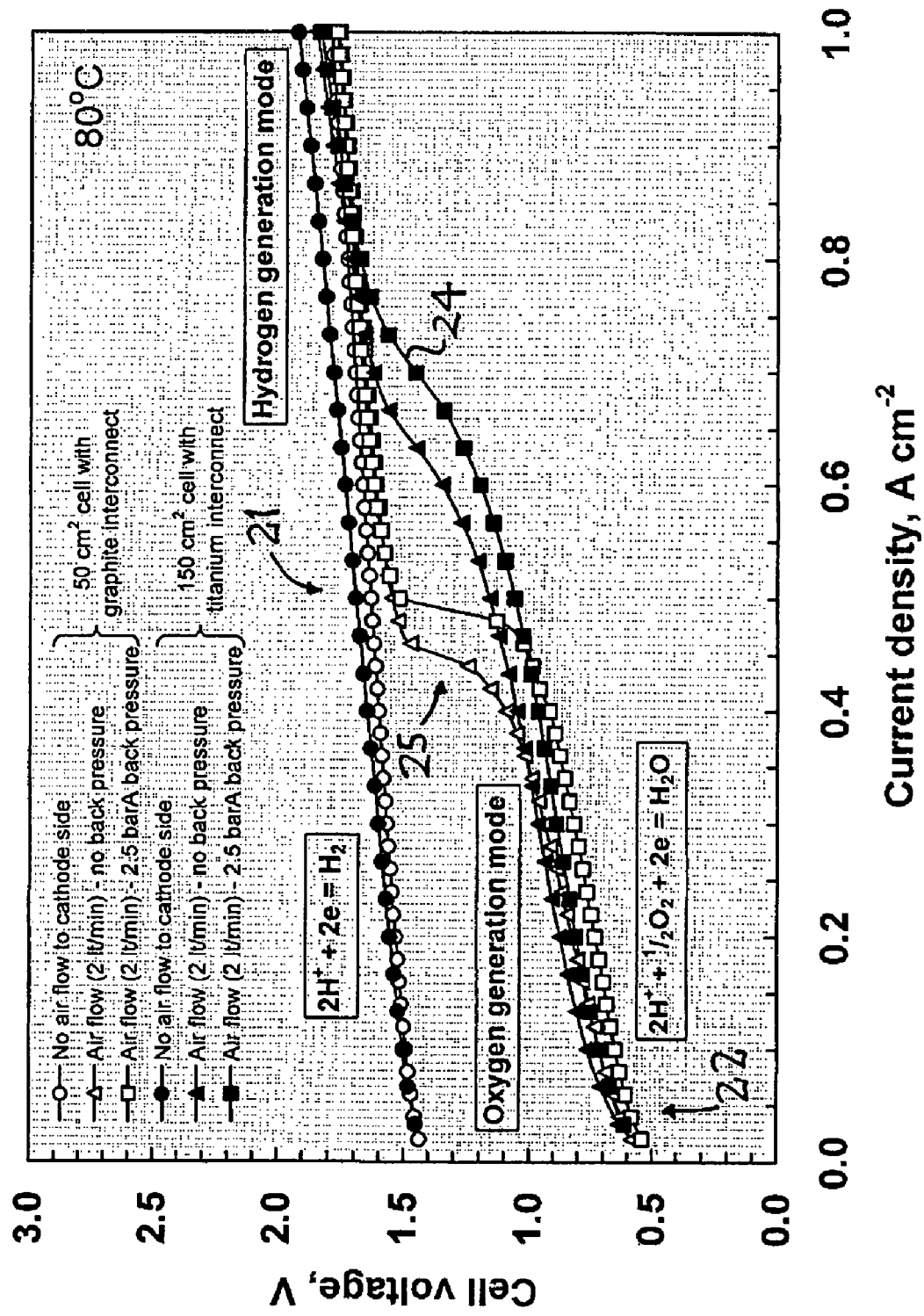
FIG. 2 is a graph showing the performance of a 50 cm$^2$ and 100 cm$^2$ active area electrolysis cells as constructed in accordance with the preferred embodiment.

FIG. 2 shows the voltage-current characteristics of the 50 and 150 cm$^2$ cell in 'hydrogen and oxygen generation' mode 21 (no air flow into hydrogen chamber of the cell) and in 'oxygen generation only' mode 22 (2L/min air supply to hydrogen chamber of the cell). This figure also shows the effect of utilizing back pressure 24, 25 in the hydrogen chamber on the voltage-current curve. The V-I curves 21, when no air is supplied to the hydrogen chamber, are typical curves obtained for electrolysis cells. But the V-I curves 22 when air is supplied to the hydrogen chamber show two distinct regions—one with significantly lower voltages and one with voltages close to obtained in the case of normal electrolysis. There are two competing electrochemical reactions occurring on the hydrogen electrode of the cell: hydrogen evolution ($2H^++2e=H_2$) and oxygen reduction ($2H^++\frac{1}{2}O_2+2e=H_2O$). The V-I curve for the 50 cm$^2$ cell shows that mainly oxygen reduction occurs below about 0.4 A.cm$^{-2}$ and mainly hydrogen evolution occurs above 0.5 A.cm$^{-2}$, with a transition zone between 0.4 to 0.5 A.cm$^{-2}$. Further, the figure shows that the increase in back pressure 24, 25 in the hydrogen chamber shifts the transition zone to higher current densities.

In order to test the concept for larger size cells and for titanium interconnect plates for hydrogen interconnect (instead of graphite), a 150 cm$^2$ cell was tested by employing a titanium hydrogen interconnect with a 4-channel parallel serpentine flow field (FIG. 6). The V-I curves obtained in this case are also shown in FIG. 2 (triangular symbols). It can be seen that titanium material is equally suitable for oxygen generation only (below certain current densities off course) and the transition zone has been pushed to higher current densities.

Figure 3:
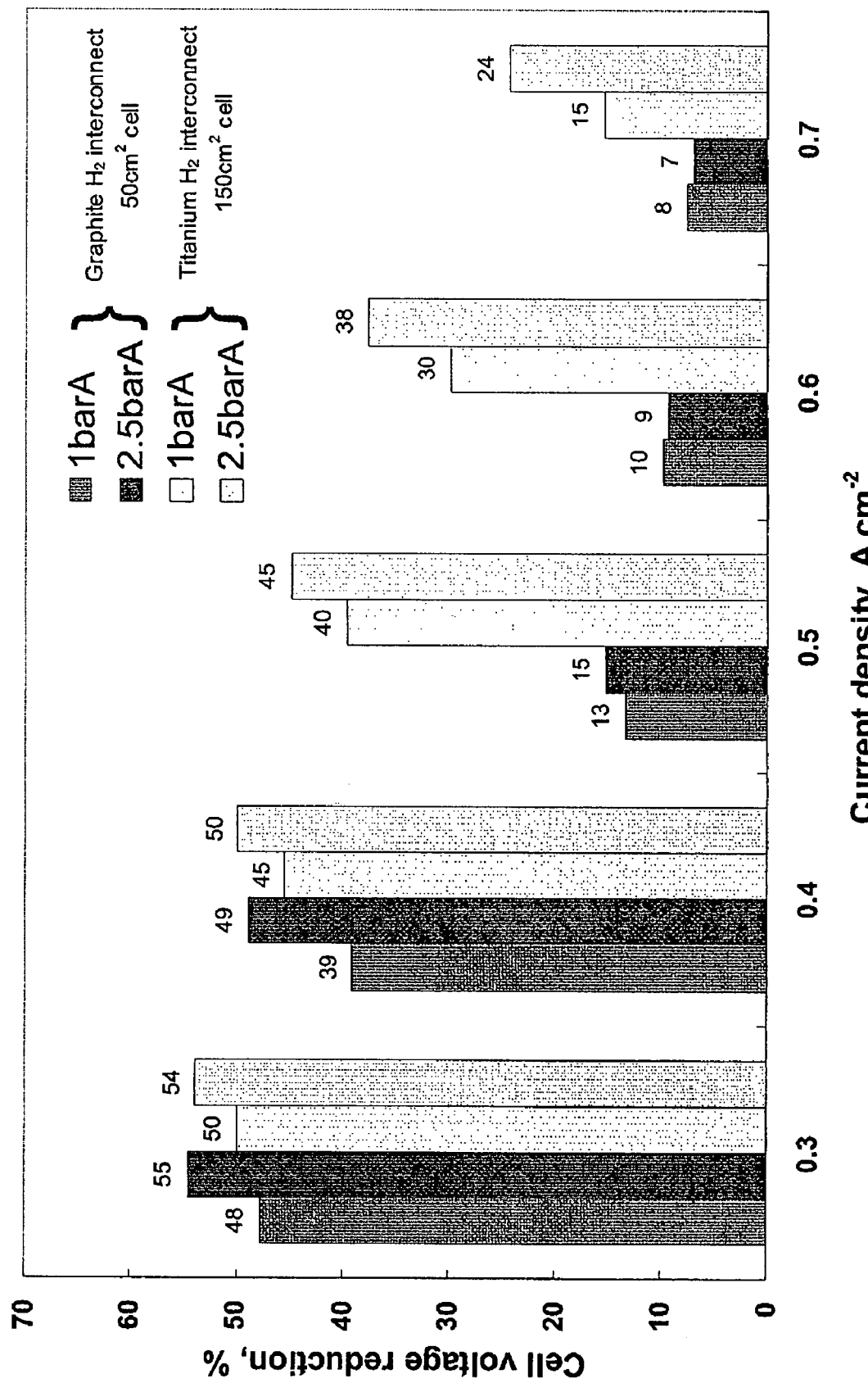
FIG. 3 is a graph comparing the operation of graphite and titanium interconnects under different pressure conditions, and showing a reduction in the percentage cell voltage when air is introduced on the cathode side relative to the device operating in purely electrolysis mode producing both hydrogen and oxygen.

FIG. 3 illustrates a bar chart showing the effect of air flow into the hydrogen chamber and back pressure on reduction in cell voltages at different current densities in case of 50 cm$^2$ and 150 cm$^2$ cells. There was found to be almost a 50% reduction in the cell voltages in case of both sizes up to 0.4 A.cm$^{-2}$, but it is significantly higher in case of 150 cm$^2$ cell (titanium interconnect) at 0.5 A.cm$^{-2}$ current density. The latter may be due to the different flow field arrangement for graphite and titanium interconnects, and larger active area.

Stack Testing and Evaluation

A 100 cm$^2$ active area 2-cell stack was designed and constructed by employing a hydrogen interconnect with 4-channel parallel serpentine flow field (FIG. 6) and water (or oxygen) interconnect with parallel cross flow field. Since the flow field design of the hydrogen interconnect has a little influence on the hydrogen reduction reaction in case of normal electrolysis cell, the flow field design (4-channel parallel serpentine) was intentionally made to suit requirements of a oxygen (only) generator.

Figure 4:
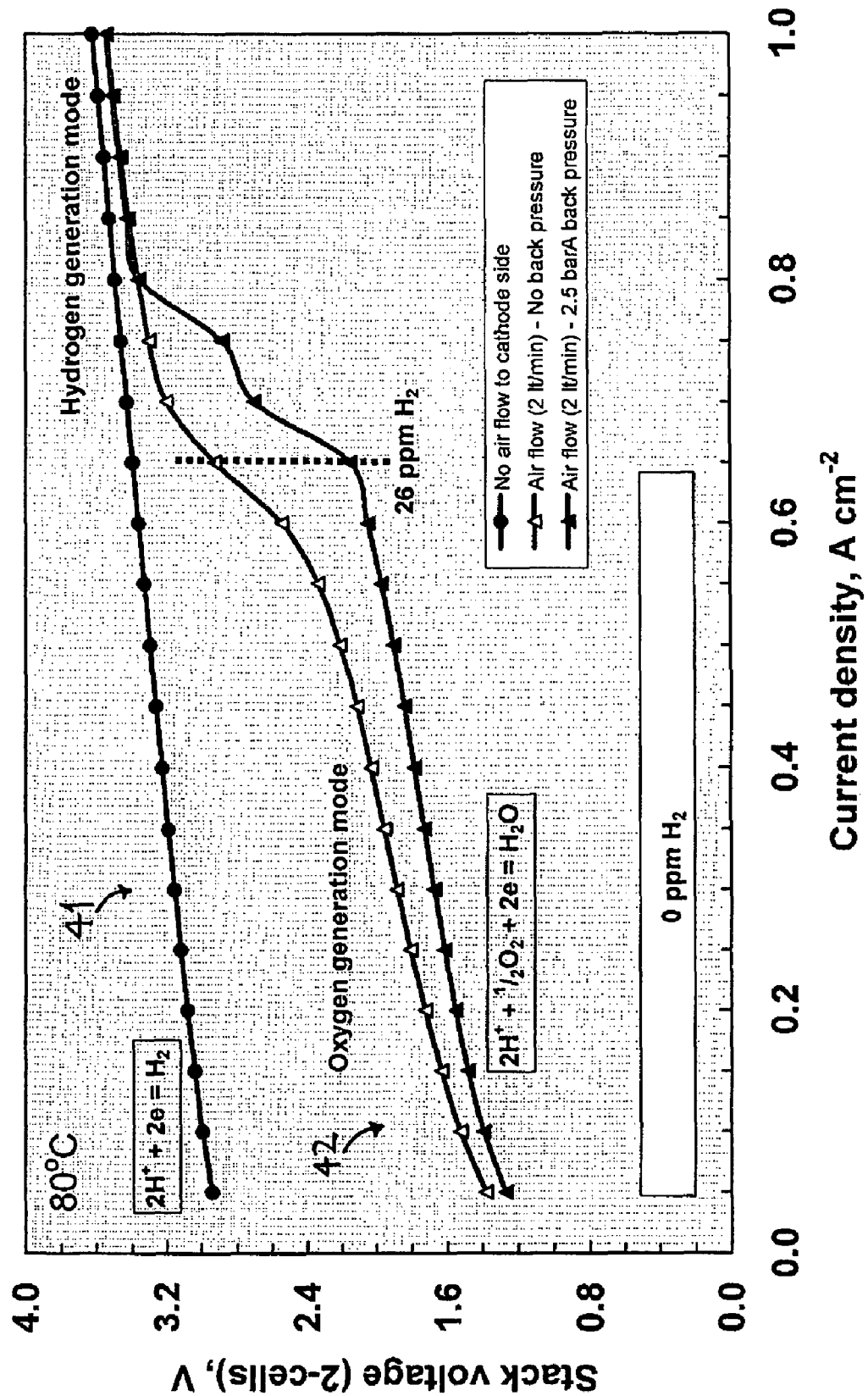
FIG. 4 is a graph showing the performance of a 2-cell stack under different pressure conditions.

FIG. 4 shows the voltage—current characteristics of the 2-cell stack operated in a normal electrolysis mode 41 and oxygen (only) generation mode 42 for different air flows. The V-I characteristics in the figure are shown for the stack in normal electrolysis mode 41 (no air flow into hydrogen chamber), and for individual cells as well as stack in oxygen 42

(only) generation mode (air flow into hydrogen chamber with and without back pressure). In order to make sure that when the stack is running in oxygen (only) generation mode, there is no hydrogen being generated in the stack, the composition of the gas exiting the hydrogen chamber was monitored with the help of a hydrogen gas sensor. It was observed that the stack with air flow rates of 2.0 L/min into hydrogen chamber at a back pressure of 2.5 barA, can be comfortably operated in oxygen (only) generation mode up to 0.60 $A.cm^{-2}$ current densities, with no hydrogen generation detected. At current densities of 0.65 $A.cm^{-2}$, only 26 ppm of hydrogen could be detected.

Although the present invention has been described with particular reference to certain preferred embodiments thereof, variations and modifications of the present invention can be effected within the spirit and scope of the following claims.

We claim:

1. An oxygen production system, comprising:
    at least one electrolysis cell in which one half of the electrolysis cell is operating in an electrolysis mode to generate oxygen and the other half of the electrolysis cell is operating in a fuel cell mode to consume hydrogen to produce water or steam and generate power to reduce energy consumption for the water electrolysis reaction, each electrolysis cell including a proton exchange membrane (PEM) between a cathode electrode and an anode electrode and interconnected to an electrical power source; and
    an air supply device configured to direct air to the cathode electrode of the electrolysis cell, so that the air is distributed substantially evenly over the surface of the cathode electrode so as to suppress hydrogen gas production and substantially consume the hydrogen in a reaction with oxygen in the air supply to form water or steam at the cathode electrode.

2. A system as claimed in claim 1 wherein the system, is configured to recycle the water or steam produced from the cathode electrode to the anode electrode thereby acting as a net oxygen separator from the supplied air.

3. A system as claimed in claim 1 configured so that the water or steam formed is subsequently utilized on the anode side of the electrolysis cell in oxygen production to reduce overall water consumption.

4. A system as claimed in claim 1 wherein the cathode electrode includes a hydrophobic material.

5. A system as claimed in claim 1 wherein said air supply is configured to supply air to the cathode at greater than atmospheric pressure.

6. A system as claimed in claim 1 wherein said air supply is configured to be variable, so as to vary the degree of hydrogen gas suppression at said cathode electrode.

7. A system as claimed in claim 1, wherein for generation of oxygen at high pressures, a foraminous conductive support is provided on the cathode side of the cell.

8. A system as claimed in claim 1, wherein the cathode electrode consists of diffusion, catalyst and ionomer layers supported on a carbon paper support with a porous structure.

9. A system as claimed in claim 7, wherein the cathode catalyst layer is deposited directly on the foraminous element which in turn is bonded directly to the electrolyte membrane, without the use of a carbon support structure.

10. A system as claimed in claim 1, wherein a foraminous conductive support is provided on the anode side of the cell which has been bonded directly to the electrolyte membrane to allow the system to be operated at a higher differential pressure across the membrane for suppression of hydrogen generation at higher current densities.

11. A system as claimed in claim 1, wherein the system is configured to generate oxygen above atmospheric pressure by supplying water to anode chamber at above atmospheric pressure.

12. A system as claimed in claim 11, wherein the pressure differential across the membrane is configured to maintain and regulate the air supply back pressure at the cathode electrode and water supply pressure on the anode electrode.

13. A system as claimed in claim 1, wherein the bipolar plate interconnect is made of oxidation resistant materials.

14. A system as claimed in claim 1, wherein a hydrogen sensor is incorporated on the cathode gas outlet to monitor safe operation of the device with optimum efficiency.

15. A multi-cell oxygen production system comprising multiple adjacently spaced oxygen production cells as claimed in claim 1, with at least two of the oxygen production cells are spaced around a bipolar electrode plate.

16. A method of oxygen production utilizing an electrolysis cell, the method including the steps of:
    (a) supplying a concentrated airflow substantially evenly over the surface of the cathode electrode of the electrolysis cell so as to suppress hydrogen production at the cathode electrode and substantially consume the hydrogen in a reaction with oxygen in the air supply to form water or steam at the cathode electrode; and
    (b) regulating operating variables such as air back pressure and volumetric air flow for uniform oxygen distribution over the entire cathode/electrolyte contact area.

17. A method as claimed in claim 16 further comprising subsequently utilizing the water or steam production in the anode side of the electrolysis cell.

* * * * *